W. R. LAZENBY.
TRAP.
APPLICATION FILED FEB. 3, 1920.

1,389,884.

Patented Sept. 6, 1921.
2 SHEETS—SHEET 1.

WITNESSES:

INVENTOR
W. R. Lazenby
BY
ATTORNEYS

W. R. LAZENBY.
TRAP.
APPLICATION FILED FEB. 3, 1920.
1,389,884.
Patented Sept. 6, 1921.
2 SHEETS—SHEET 2.
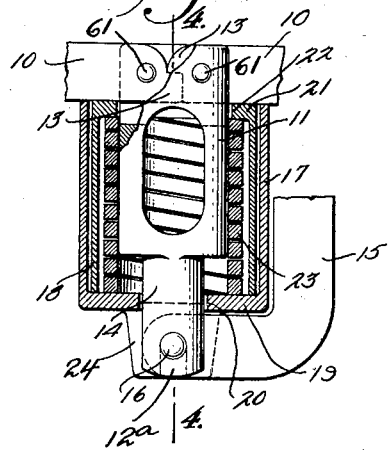
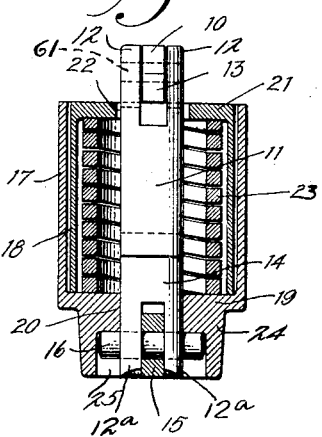
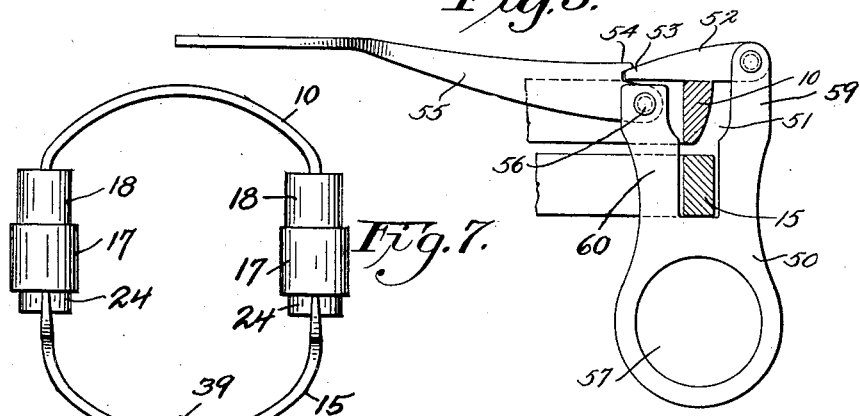
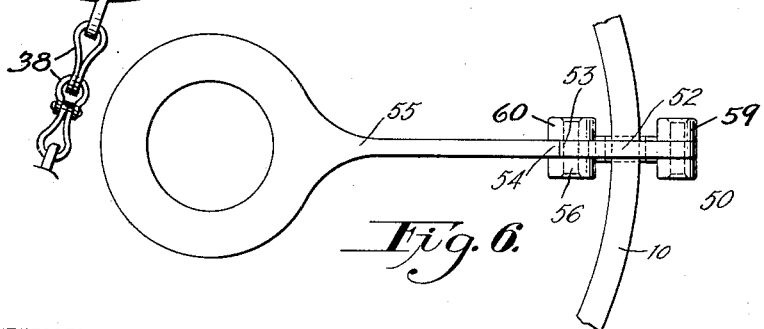
WITNESSES:
INVENTOR
W. R. Lazenby
BY
ATTORNEYS

UNITED STATES PATENT OFFICE.

WILLIAM R. LAZENBY, OF HARDIN, MONTANA.

TRAP.

1,389,884.   Specification of Letters Patent.   Patented Sept. 6, 1921.

Application filed February 3, 1920. Serial No. 356,098.

*To all whom it may concern:*

Be it known that I, WILLIAM R. LAZENBY, a citizen of the United States, and a resident of Hardin, Big Horn county, and State of Montana, have invented a new and Improved Trap, of which the following is a full, clear, and exact description.

This invention relates to animal traps and has particular reference to an improvement in what are commonly known as steel traps, provided with spring actuated jaws adapted to clamp the foot of an animal therebetween.

In traps of this character now in general use, the trigger means which serves to retain the jaws in their open position is usually constructed as an integral part of the trap, or rigidly secured thereto. In many instances such an arrangement serves as a means by which the trapped animal may effect its escape.

In the present invention one of the principal objects resides in the provision of a trigger member constructed as an independent element which may be loosely attached to the anchor chain but which is free to fall clear of the jaws as soon as the jaws have been sprung into closed position.

Another object of the invention is to provide a means for effecting the closure of the jaws which also serves to retain the several parts of the trap in their proper relation, thus obviating the necessity of employing screws, bolts or other removable fastening devices.

A further object of the invention is to provide a trap, the working parts of which are all encompassed within a small space thus minimizing the labor required to excavate an artificial depression for positioning the same.

A still further object of the invention resides in the provision of a trap of the class described which is simple in construction, efficient in purpose, strong, durable, and inexpensive to manufacture.

With these and other objects in view which will be more readily apparent as the nature, purpose and operation is understood from the following description and claims, reference is made to the accompanying drawings forming a part of this application and in which;

Fig. 3 is a fragmentary sectional view taken approximately on the line 3—3 of Fig. 1.

Fig. 4 is a sectional view taken on the line 4—4 of Fig. 3.

Fig. 5 is a fragmentary sectional view illustrating the application of a modified form of trigger.

Fig. 6 is a fragmentary plan view thereof.

Fig. 7 is a side elevation of the trap, illustrating the jaws in closed position.

Figure 1:
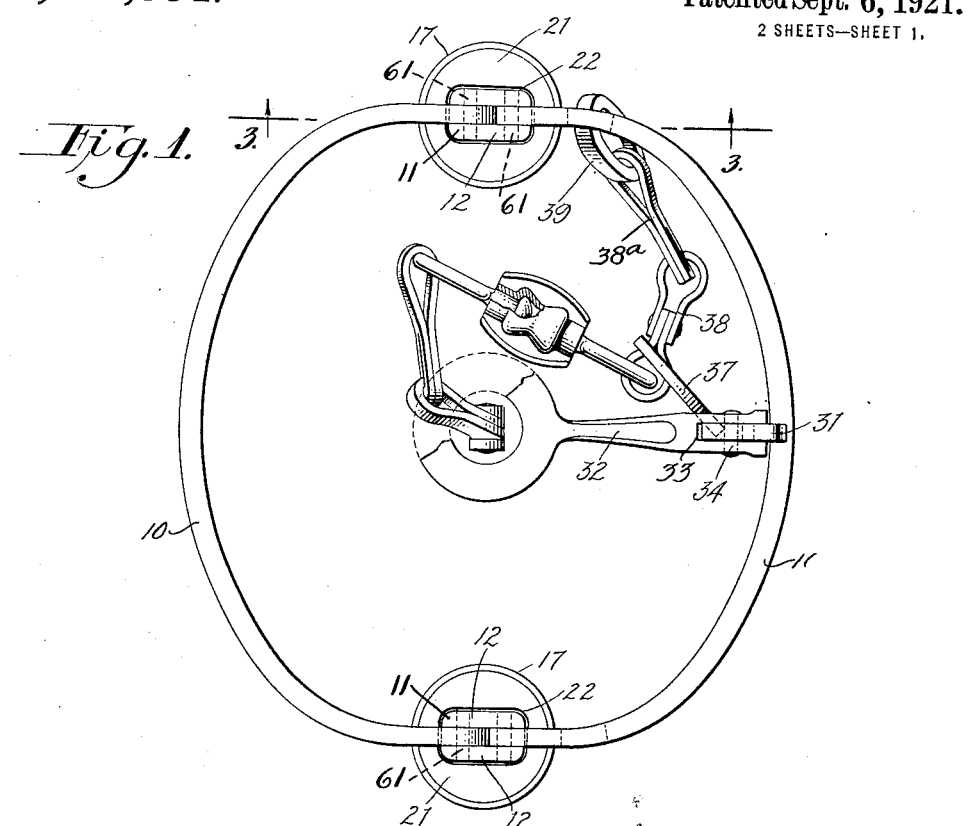
Figure 1 is a plan view of the trap illustrating the same in set condition.

Referring to the drawings by characters of reference which denote like parts throughout the several views thereof; 10—10 designates a pair of swinging jaws which are respectively pivoted at their opposite ends to the links 11 between the furcations 12 formed thereon, and which are provided with co-acting lugs 13—13 serving to limit the opening of the jaws. The free extremities of the links are preferably reduced as at 14 and bifurcated to receive between the furcations $12^a$ the opposite ends of a bail 15. Pivots 16 are passed through the furcations $12^a$ and the extremities of the bail 15 in order to pivotally secure the latter thereto. A housing including telescopic sections 17 and 18, is provided, the former section 17 having a closed end 19 provided with an opening 20 through which the reduced portion 14 of the link 11 is adapted to extend. The section 18 is provided with a closed end 21 having an opening 22 through which the main body portion of the link 11 is adapted to extend. A spring 23 embraces the link 11 and is arranged within the housing sections 17 and 18, the opposite ends of the spring 23 respectively engaging the closed ends 19 and 21 of the housing sections 17 and 18 to normally effect relative separation of the ends 19 and 21. The closed end 19 of the section 17 is provided on its underside with an integral boss 24 which is transversely slotted to permit of the free swinging movement of the ends of the bail 16 through which ends the pivot pin passes. The boss is centrally recessed as at 20 to accommodate the reduced portion 14 of the link, and communicating recesses 25 are disposed at opposite sides of the central recess 20, to accommodate the portions of the pivot 16 which extend from the opposite sides of the portion 14. The said extended portions of the pivot 16 are adapted to normally co-act with the inner faces of the recesses 25 under the tension of the spring 23, as shown in Fig. 4, to retain the housing section 17 in place. By this arrangement it will be seen that when the jaws 10 are held in open position and released the force of the spring 23 against the closed end 21 of the section 18 will cause contact of said end 21 with the jaws 10 to close the jaws 10, the section 18 moving upwardly on jaws 10 until arrested by contact of end 21 of section 18 with the enlarged portions 27 formed on the undersides of the jaws 10 in Fig. 2. This contact of end 21 with the enlarged portions 27 serves to lock the jaws 10 until the section 18 is again telescoped within the section 17, as shown in Figs. 3 and 4.

In assembling the parts after the jaws 10 have been pivoted by pins 61 to the links 11, the jaws 10 are arranged in closed position, and the sections 18 placed thereover until their closed ends 21 engage the portions 27; the spring 23 is then positioned within the section 18 and the section 17 applied and forced against the action of the spring 23 until extreme bottom end of the boss 24 clears or is above the openings in the reduced portion 14 of the links through which opening the pins 16 pass; the apertured extremity of the bail 15 is then registered with the openings in the reduced portion 14 and the pivots 16 inserted through said apertured extremity of bail 15 and also through the openings in the reduced portion 14, as shown in Fig. 4; the force of the spring 23 will then serve to properly position as shown in Fig. 4 the communicating recesses 25 with respect to the extended portions of the pivots 16.

Figure 2:
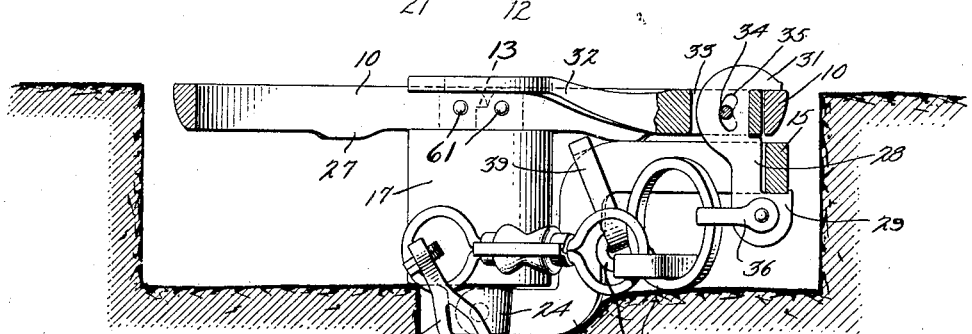
Fig. 2 is a vertical sectional view therethrough illustrating the same positioned within an artificial depresson and attached to a suitable anchoring means, parts being broken away to disclose the underlying structure.

The trigger mechanism shown in Fig. 2 includes a retaining device 28 provided with an extension 29 and a nose 31, the former extension 29 adapted to engage the bail 15 and the latter, nose 31, adapted to engage one of the jaws 10 when such one of the jaws 10 is arranged in open position. The trip lever 32 is slotted as at 33 for the reception of the retaining device 28 and is provided with a transverse pin 34 which is adapted to work in the arcuate slot 35 formed in said retaining device 28. The extended portion 29 of the retaining device 28 has secured thereto a clevis 36 through which a ring 37 may be passed for connecting the trigger mechanism to an anchor chain 38 whereby to permit the trigger mechanism to fall clear of the locking jaws 10 after the jaws 10 have been sprung. A ring 39 serves to connect the bail 15 with the free extremity 38ª of the anchor chain 38 in order to anchor the trap to the anchoring device 40.

As illustrated in Fig. 2 the anchoring device includes a rod 41, which is provided at its lower end with an anchor plate 42 adapted to be positioned and buried in a well 58 previously excavated. The upper extremity of the rod 41 is provided with a spherical head 43, and means for removably connecting the chain 38 to the rod is provided which is in the nature of a clevis 48 connected to an angle plate 44 slotted as at 45, said slotted portion having an enlarged opening 46 communicating with the slot 45 at the upper end of the slot 45. The purpose of the enlarged opening 46 is to permit of the removal of the angle plate 44 from the rod 41 when the spherical head is registered with the opening 46. One of the side walls of the slot 45 is recessed as at 47 to accommodate the clevis 48 which is positioned in recesses 47 prior to the attempted removal of the angle plate 44 from the rod 41 as will be readily understood.

In operation of the trap the jaws 10—10 are arranged in open position as shown in Fig. 2, and the bail 15 swung to a position parallel with one of the jaws 10—10; the trigger mechanism 28 is then arranged in proper position by engaging the extension 29 under the bail 15, and the nose 31 above the jaw 10, the force of the springs 23 serving to maintain the members 29, 15, 31 and 10 in place, the trip lever 32 being disposed centrally of the open jaws 10. When the animal's foot contacts with the trip lever 32 the latter's inner extremity will be forced against the inner side of the jaw 10, the slightest pressure on said trip lever 32 serving to disengage the nose 31 from the jaw 10. As soon as the nose 31 is disengaged the force of the springs 23 will immediately effect a separation of the sections 17 and 18, the closed ends 21 of the sections 18 effecting a closing of the jaws 10—10 which will be swung upwardly to a parallel position with relation to one another, allowing the section 18 to be projected over the pivoted ends of the jaws 10—10 until said closed ends 21 engage the stops 27. This will effectively lock the jaws 10—10 against relative separation until the section 18 is depressed. As soon as the nose 31 of the retaining device 28 has been released from the jaw 10 the entire trigger mechanism 28 will fall by gravity clear of the jaws 10—10, and as the animal drags the trap to the limit of the length of the anchoring chain 38, the bail 15 will swing upon its pivots 16 and the chain 38 will be free to move through the ring 37. In attaching or detaching the anchoring chain 38 to the rod 41 the bight of the clevis 48 is arranged in the recess 47 and the enlarged opening 46 passed over or withdrawn from the head 43. When the clevis 48 is arranged in the recess 47 the slot 45 is free to move over the rod 41, and after the rod 41 has been properly positioned at the lower extremity of said slot 45 the clevis 48 may be moved to lie within the enlarged opening 46 to effectively prevent removal of the enlarged opening 46 from the head 42.

In the modified form of trigger mechanism illustrated in Figs. 5 and 6 of the drawings, the retaining device 50 is bifurcated as at 51 and has pivoted to the outer furcation 59 a catch 52, the free extremity of which catch 52 constitutes a nose 53 adapted to be engaged by a lip 54 formed on the trigger 55, said trigger 55 being pivoted as at 56 to the inner furcation 60 of the retaining device 50. In use of this form of trigger mechanism, the bail 15 and one of the jaws 10 are arranged within the bifurcated portion 51, the tension of the springs 23 serving to maintain the nose 53 in engagement with the lip 54. The retaining device 50 in this form is provided with an attaching ring 57 which serves to connect the retaining device 50 with the anchor chain 38.

As shown in Fig. 5, in operation of the modified form of trigger 50, after the jaws 10—10 have been opened and the bail 15 arranged in parallel relation with respect to one of the jaws 10, the bifurcated portion 51 is adapted to straddle the jaw 10 and bail 15, the catch 52 being positioned to obstruct the open end of the bifurcated portion 51 and the nose 53 of said catch 52 engaged with the lip 54. The spring 23 will serve to set up a frictional engagement between the nose 53 and said lip 54 to prevent relative separation of the telescopic sections 17 and 18 under the action of the springs 23 until the trigger 55 is actuated.

While there has been illustrated and described several preferred embodiments of reducing the invention to practice, the same are merely illustrative, and no limitation is made to the precise details of construction, but it is understood that changes and variations falling within the scope of the appended claims may be resorted to when found expedient.

Having thus described my invention what I claim as new and desire to secure by Letters Patent is as follows:—

1. A trap comprising a pair of clamping jaws, a pair of links each constituting a common support for the adjacent ends of said jaws, and to which the said jaws are pivoted, a bail pivoted to said links and attached to an anchoring device, means embracing each link and serving to normally close the jaws, and a trigger controlled retaining means adapted to co-act with one of the jaws and the bail for holding the trap in set condition and the jaw closing means inactive, said retaining means freely carried by the anchoring device.

2. A trap comprising a bail attached to an anchoring device, a pair of links pivoted to its opposite extremities, jaws pivotally secured at their adjacent ends, to each link, means for effecting a normal closure of said jaws, retaining means adapted to co-act with the bail and one of the jaws for holding said jaws in an open position and the jaw closing means inactive, and a tripping member carried by the retaining means and disposed between the jaws, said retaining means freely carried by the anchoring device.

3. A trap comprising a bail attached to an anchoring device, links pivoted at one extremity to the opposite ends, jaws pivotally attached to the remaining extremity of each link, housings embracing the medial portion of said links, said housings including relatively separable telescopic means, means for effecting a normal separation of said housing sections to effect closing of the jaws, and means adapted to co-act with the bail and one of the jaws for retaining said jaws in open position and the housing sections against separation, and a tripping device carried by the retaining means and disposed between the said jaws, said retaining means being freely carried by the anchoring device.

4. A trap including a pair of jaws, links pivoted respectively to the adjacent extremity of each jaw and serving to swingingly connect the same, a bail pivoted at its opposite ends to the free terminal of each link, relatively separable telescopic housing sections embracing each link, means for effecting a normal separation of said telescopic means, and a trigger mechanism adapted to co-act with the bail and one of the jaws for retaining said jaws in open position and the housing sections against relative separation.

5. A trap comprising a pair of jaws, links pivoted to each jaw, housings including relatively separable telescopic sections adapted to embrace the links, means for normally effecting relative separation of said sections, a bail pivoted to the free extremity of each link and adapted to be arranged in parallel relation with respect to one of the jaws when the same is arranged in open position, retaining means adapted to co-act with said jaw and the bail for holding the jaws in open position, and a tripping device provided on the retaining means.

6. A trap including a pair of links bifurcated at the opposite ends, a pair of jaws respectively having the terminals of each pivoted within one of the bifurcations of one link and within one of the bifurcations of the other link, a bail having its terminals pivoted within the remaining bifurcated portion of each link, housings including cylindrical telescopic sections each provided with a closed end having an opening therethrough, the bifurcated portions of the links adapted to extend through the openings in said housing sections, means for effecting relative separation of said sections, and a trigger controlled retaining device adapted to co-act with the bail and one of the jaws to hold the trap in open set condition.

7. A trap including a pair of links bifurcated at their opposite ends, a pair of jaws having one terminal of each respectively pivoted within one of the bifurcations of one link and within one of the bifurcations of the other link, co-acting means provided on the pivoted end of each jaw serving to limit the opening of the jaws, a bail having its terminals pivoted within the remaining bifurcated portion of each link, housings including cylindrical telescopic sections each provided with a closed end having an opening therethrough, the bifurcated portions of the links adapted to extend through the openings in said housing sections, means for effecting relative separation of said sections, and a trigger controlled retaining device adapted to co-act with the bail and one of the jaws to hold the trap in open set position.

WILLIAM R. LAZENBY.